United States Patent [19]

Bradshaw

[11] Patent Number: 4,730,252

[45] Date of Patent: Mar. 8, 1988

[54] DOCUMENT COMPOSITION FROM PARTS INVENTORY

[75] Inventor: Kenneth A. Bradshaw, Bedford, Tex.

[73] Assignee: International Business Machines Corp., Armonk, N.Y.

[21] Appl. No.: 779,535

[22] Filed: Sep. 24, 1985

[51] Int. Cl.⁴ .................. G06F 3/12; G06F 15/21
[52] U.S. Cl. .................... 364/403; 364/900; 364/300
[58] Field of Search .......... 364/403, 419, 200, 900, 364/300; 400/63, 68; 340/720, 721, 723, 724

[56] References Cited

U.S. PATENT DOCUMENTS

| | | | |
|---|---|---|---|
| 4,085,445 | 4/1978 | Blevins | 364/900 |
| 4,417,322 | 11/1983 | Berry | 364/900 |
| 4,445,795 | 5/1984 | Levine | 364/300 |
| 4,454,576 | 6/1984 | McInroy | 364/200 |
| 4,555,759 | 11/1985 | McCaskill | 364/300 |
| 4,555,796 | 11/1985 | Sakoe | 364/300 |
| 4,559,598 | 12/1985 | Goldwasser | 364/419 |
| 4,593,356 | 6/1986 | Hashimoto | 364/419 |
| 4,633,430 | 12/1986 | Cooper | 364/900 |

Primary Examiner—Michael R. Fleming
Attorney, Agent, or Firm—C. Lamont Whitham

[57] ABSTRACT

A document preparation program for use in connection with a word processing facility includes a succinct identification and listing of designated parts of a memorandum or document, each unique part having access to an associated file which contains the basic text and formatting controls for that particular part. The user of the program may readily assemble a document from the parts inventory displayed on a master screen by mere cursor reference or by keying the name of designated parts and have the newly created document displayed, or printed in most cases without reference to additional screens.

21 Claims, 4 Drawing Figures

|  | C1 | C2 | C3 | C4 | C5 | C6 | C7 | C8 | C9 | C10 | C11 | C12 | C13 |
|---|---|---|---|---|---|---|---|---|---|---|---|---|---|
| R1 | MPI (MEMO PARTS INTERFACE) | | | | | | | | | | | | |
| R2 | | | SELECTIONS | | | PARTS | (* = MINIMUM REQUIRED - TO, FROM, BODY) | | | | | | |
| R3 | | | | | | | | | | | | | |
| R4 | PF1 =QUIT | *TO | = TFG | TFG | YYY | ADD | ABC | BCD | CDE | DEF | EFG | FGH | OHI |
| R5 | | | | RVW | HBW | RVW | KTW | RVW | LEW | | | | |
| R6 | PF2 =CHECK | | | | | | | | | | | | |
| R7 | SPELLING | CLAS | = NONE | NONE | INUO | CONF | OTHR= | | | | | | |
| R8 | | DATE | = August | 26, 1985 | | | (Key a different date if desired) | | | | | | |
| R9 | PF3 =VIEW MEMO | *FROM | = RVW | RVW | LMN | MNO | NOP | OPQ | POR | | | | |
| R10 | PF4 =SCROLL | SUBJ | = RPTM | RPTM | RPTW | BGTR | TRAN | NAPR | | | | | |
| R11 | LIST | | | | | | | | | | | | |
| R12 | | REF | = I114 | I105 | I108 | I110 | MM10 | I114 | | | | | |
| R13 | PF5 =PRINT A | *BODY | = RPTM | RPTM | RPTW | BGTR | TRAN | NAPI | NAP2 | | | | |
| R14 | DRAFT COPY | | | | | | | | | | | | |
| R15 | PF6 =PRINT A | | | | | | | | | | | | |
| R16 | FINAL COPY CC | = ADD | | TFG | BMW | ERW | BCD | CDE | KO | ADD | | | |
| R17 | PF7 =ERASE | | | | | | | | | | | | |
| R18 | PF8 =XEDIT | DIST | = | A | B | C | | | | | | | |
| R19 | PF9 =SCROLL LOG | | | | | | | | | | | | |
| R20 | FORWARD | ATT | = Y | Y | N | Attachment? (Y or N) | | | | | | | |
| R21 | PF10=SCROLL LOG | ATTPI= | | | (Name of a SCRIPT file you wish attached) | | | | | | | | |
| R22 | BACKWARD | COPYS= 01 | | FONT = COURIER | | | | | | | | | |
| R23 | PF11=VIEW LOG | PRNTR= 6670 | | 3800 1403 6670 | | | | | | | | | |
| R24 | PF12=HELP | PRTID= 6670E11A | | | | | | | | | | | |

FIG. 1

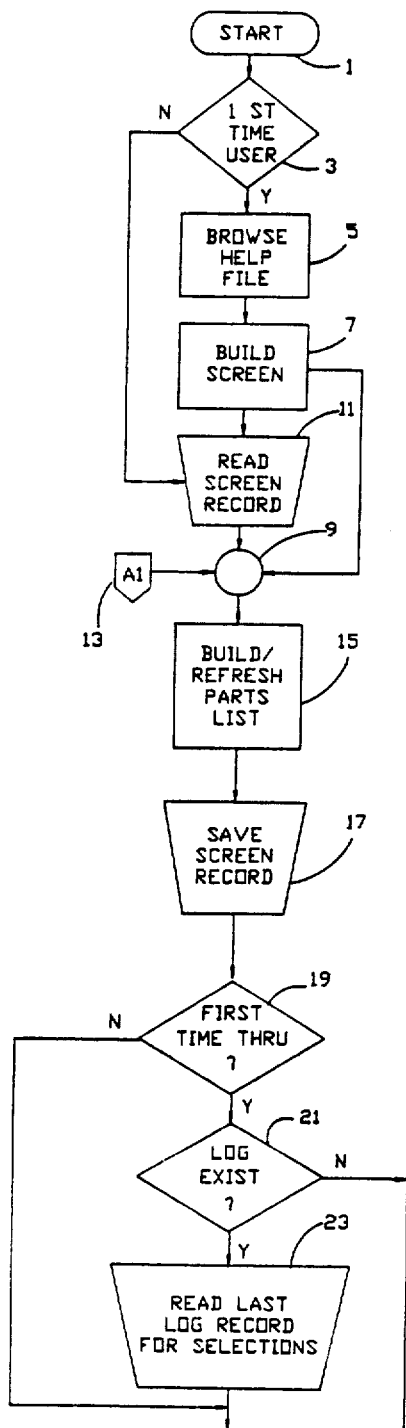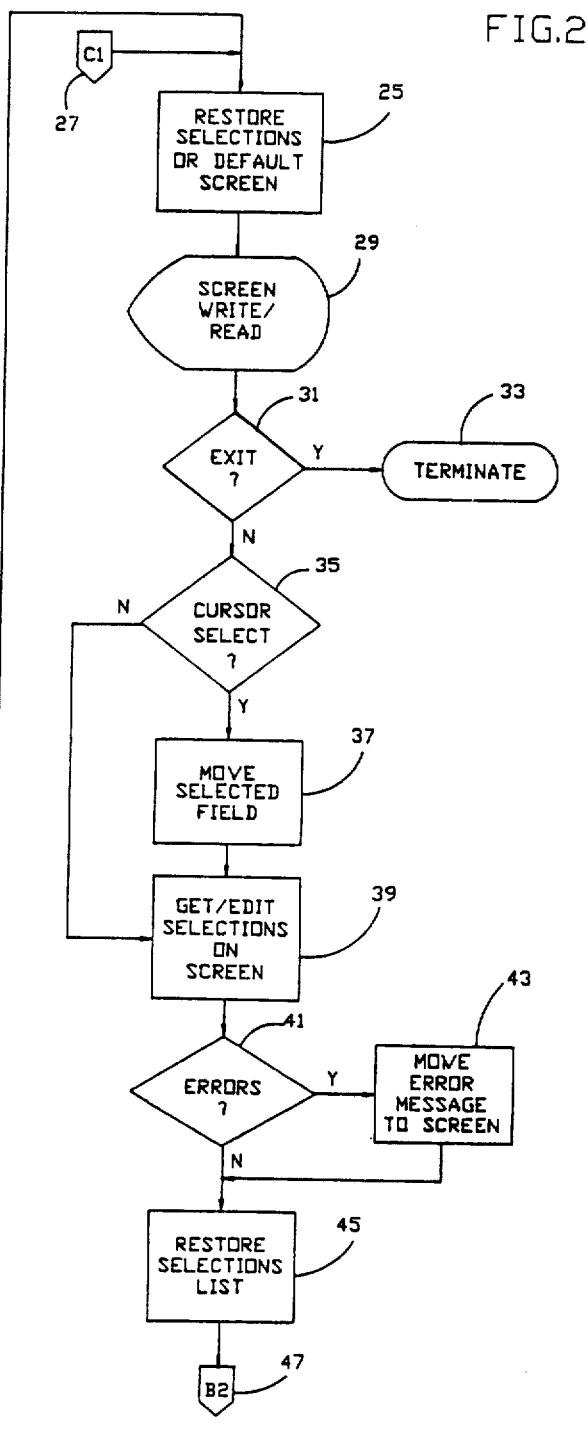
FIG.2

DOCUMENT COMPOSITION FROM PARTS INVENTORY

BACKGROUND OF THE INVENTION

This invention relates generally to word processing systems and more particularly to a method for creating a document parts inventory and composing final documents by referencing selected parts of the inventory.

In connection with microcomputers and computer work-stations, there are a number of word processing programs available to facilitate the task of preparing correspondence in the form of letters and memos as well as the preparation of other documents for transmittal where hard copies are required. Through the years, such programs have been improved in many ways in order to make it easier for the user to determine the content of a document and then to compose the requisite content items in a predefined manner which is frequently the same in all cases with regard to a specific form of correspondence.

Many of these word processing programs permit the creation of so-called standard form letters and the identification of those letters as separate files on a file screen of a video display terminal (VDT). A VDT operator may display the file screen and select which file or letter is to be displayed on the screen and to which changes may be made to customize that previous file or letter to a current situation and save that newly created document to a new file. That process, however, normally involves a significant amount of keying by the operator since addressees, subjects, mailing addresses and content as well as the identity of individuals receiving copies, all have to be changed in most cases. Moreover, a substantial amount of time is required for content changes to the letters since sections of text must be identified and deleted and new sections require identification, keying in, insertion and proofreading before the document can be printed in final form.

Notwithstanding the improvements which have been made to word processing programs over the years, there still exists a need for a word processing facility by which operator keying is significantly reduced and documents can be created in even shorter periods of time using document portions previously created thereby minimizing the keying in and proofreading of added text.

SUMMARY OF THE INVENTION

Accordingly, it is an object of the present invention to provide an improved word processing system by which an operator may create and save a significant inventory of document parts and create new documents by a selective "pointing" to the inventory parts desired to be included in the required document. A preferred embodiment of the present invention displays a document parts inventory to the user on a single screen from which the user may compose a new document by screen references to the parts desired, and effect the printing of the selectively composed document, in most cases without reference to additional screens.

BRIEF DESCRIPTION OF THE DRAWINGS

A better understanding of the present invention may be had when the following specification is read with reference to the accompanying drawings in which:

FIG. 1 is an illustration of the document parts inventory screen of the present invention;

FIG. 2 is an illustration of the program flow and function implemented to support the operation of the present invention;

DETAILED DESCRIPTION OF THE INVENTION

Figure 3:
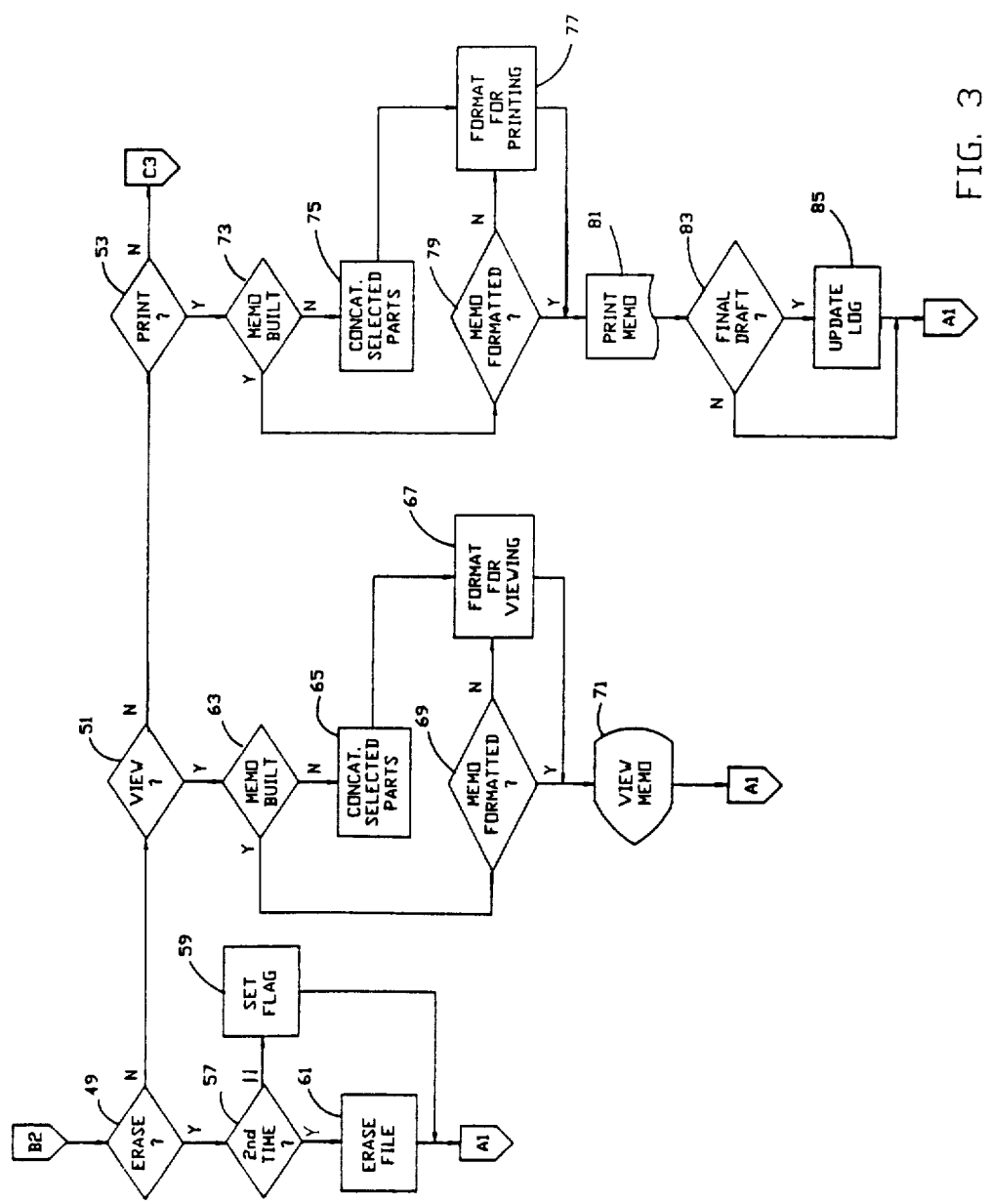
FIG. 3 is a continuation of FIG. 2.

The present invention, as disclosed herein, has been designed to run in connection with, or "on top of", a typical word processing program which includes editing functions utilized by the present invention in creating and modifying the document parts inventory files. Such basic editing operations are available on the market and well known in the art. Subsequent reference to an "XEDIT" function will be understood to mean such an editing function which has the capability of manipulating text including facilities to insert and delete text from a displayed document.

In one embodiment of the present invention, the implementing code was used in connection with an IBM Personal Computer XT connected in a network to a host IBM 3081 mainframe computer which in turn was running the IBM Virtual Machine System Product (VM/SP).

Referring in detail to FIG. 1, there is shown the master menu for the memo parts inventory or interface system. The main screen has 24 rows designated R1 through R24 and includes 13 columns designated C1 through C13. The FIG. 1 screen is displayed to the user after the user keys in the initials "MPI" and hits the enter key on his video display terminal after logging onto the VM system.

The first column C1 of the master menu designates the control functions available to the program. The "PF1-PF12" designations on the screen refer to corresponding function keys on an operator keyboard which, on the Personal Computer XT, are designated F1-F10, and shifted F9 and F10, respectively. Although the designated functions are somewhat self-explanatory, they will be explained in more detail in connection with the following description of an exemplary application of the present invention.

In column C2, portions of a typical document are identified and those portions comprise the parts inventory for the documents to be created using the present invention. In column C3, the selected inventory parts are displayed. The short identifier fields in column 3 designate corresponding files in the system which are selected for the document presently being composed, or default designations in the event files are unspecified by the operator.

Columns C4-C13 generally indicate the short identifiers for particular files which have previously been created and which are available for selection by a user to include in a document presently being composed. As shown, the "TO" inventory part of a document is arranged in the present example to contain three rows of 10 columns each, or 30 files, with each file containing the name of an individual or department to whom memos are frequently sent. It should be noted that more than 30 files may be created and stored but only 30 will appear on the screen in the present example. Files not appearing on the screen may be viewed by moving the cursor anywhere in the "TO" fields and depressing the PF4 key to "Scroll List". In other applications, the "TO" list of files may have more or fewer spaces for files and the "Body" or other list or document part may be designed to display fewer or more files so that the total number of displayed short identifiers remains the same.

In row R7, there are shown the various classifications ("CLAS") of the document which may apply. For example, at R7 C4, the designation "NONE" means that the document being composed is not classified in any way. The program may be designed so that each of the designations in C2 may or may not appear in the hard copy of the memo being created regardless of whether or not there is a user input or selection made in the corresponding C3 position. At R8, C2, the date of the memorandum is designated and in the present example is defaulted to or automatically inserted as the current date, but may be typed over for a different date.

At R9, there are 10 columns to identify 10 individuals or departments from whom the memo may be sent. That facility is useful in departments where one or more secretaries type for a number of people, all of whom may send or receive memos or correspondence. Moreover, the files are arranged to contain specific address information of the sender, and may include items which vary from individual to individual even within the department such as the individual's phone number or virtual machine terminal identification (VMID). It should be noted that the document parts identified as "TO", "FROM", and "BODY", have an asterisk associated therewith to indicate in the present embodiment that at least those three items require a user input before the memo can be sent. If one or more parts is lacking, an error message will be displayed to so indicate.

At R10 and R11, there are 10 columns each for storing standard "subject" inputs ("SUBJ"). Each of the files included in column C4 through C13 have space for a four-character designator although file designators having fewer characters may be used. For example, in row R12 which includes possible "reference" insertions ("REF"), C4 specifies "I105" which could stand for the corporate instruction, which could set forth the policy of the company with regard to a particular area of interest and the practices which are required to be implemented in that particular area by corporate management. In that case, that particular corporate instruction would be referenced on many different internal memoranda although each one would specifically include a report or correspondence with regard to only one practice covered by the broad policy.

At rows R13–R15 there are 10 columns each for a total of 30 possible file identifiers of which each one designates a particular "BODY" of a memorandum for a different "standard form". For example, the file at R13, C4, is identified as "RPTM" which could stand for a required monthly report which must be submitted in accordance with the referenced corporate instruction I105. The file at R13, C5 "RPTW", could stand for a weekly report and "BGTR" at C6 could mean the standard "BODY" for a budget request. Generally, the body files will have some correspondence to the subject files although there may be several body files which could correspond to one general subject file. For example, at R10, C8, the "SUBJ" file designated in "APR" could generally stand for "Name Approval" for the name of a new product. Under that general subject, there may be several procedural documents which are routinely sent. For example, at R13, C8, the "BODY" file "NAPI" could stand for a first standard correspondence under the name approval procedure which could be a request from one department to another for its concurrence and approval of a proposed name while "NAP2" at R13, C9, could refer to a stored file containing the body portion of a memo which provides notice to various departments that a proposed name for a new product has received the necessary approvals.

At rows 16 and 17, there are spaces for the identification of 20 possible files which, in this case, are individuals to whom carbon copies of memoranda are frequently sent. It should be noted that although the present example shows specific numbers of files for each particular document part, the number of files available for each part may vary among users depending upon the application, and the main menu shown in FIG. 1 along with the underlying implementing program can be modified accordingly to suit particular needs with regard to numbers of files required without departing from the scope of the present invention.

At R18, C4–C13, there are 20 potential files to identify 20 different distribution lists "DIST" of individuals or departments for receiving memos or documents being created. "ATT" at R20, C2 indicates whether or not attachments "ATT" are to be forwarded along with the created memo and an entry at R21, C3 allows a user to attach another file "ATTFI" which is electronically stored in system memory.

At R22, C3 a user is allowed to specify the number of copies "COPYS" of the memorandum to be printed, as well as the particular font "FONT" desired at R22, C5–6. Row R23 identifies the particular kinds of printers "PRNTR" on which the memo is to be printed, and R24, C3 specifies the location of the printer "PRTID" at which the created memorandum is to be printed.

Figure 4:
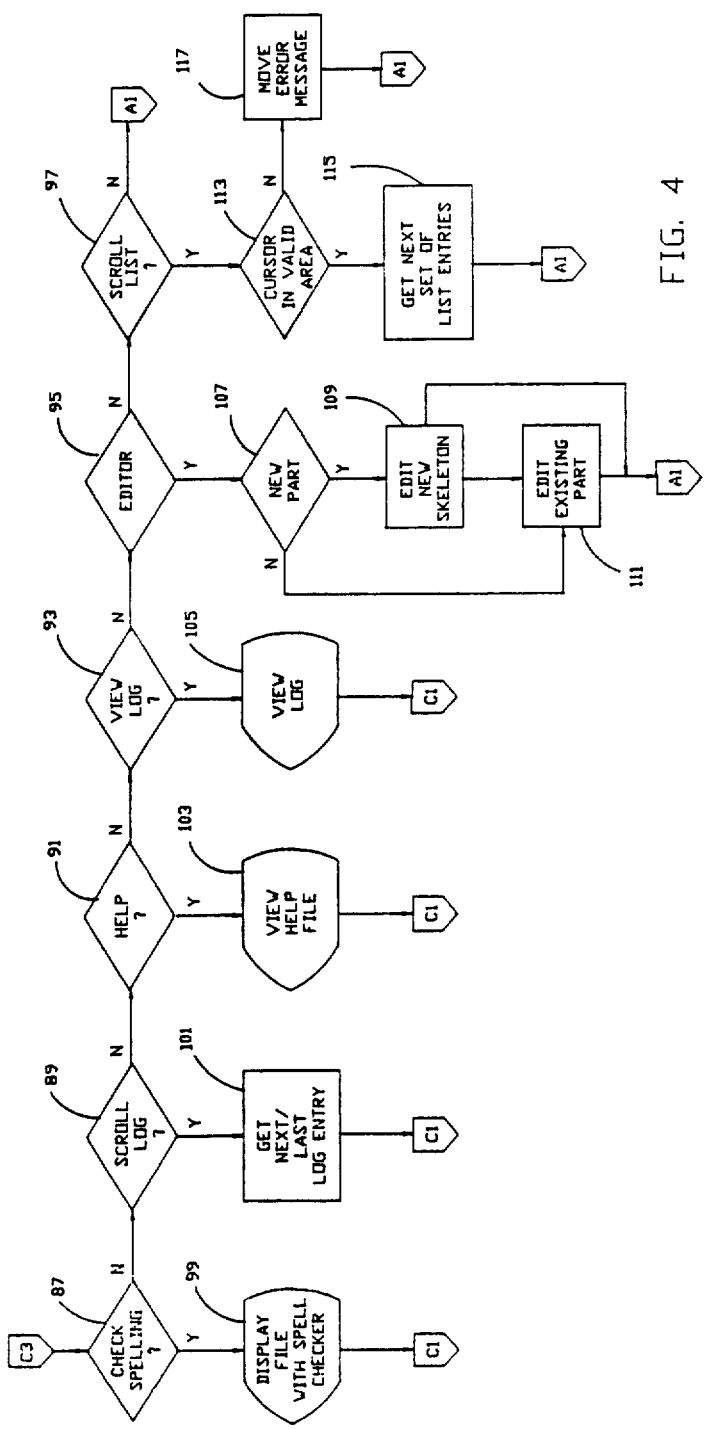
FIG. 4 is a continuation of FIG. 3.

FIGS. 2 through 4 illustrate, in logical flow, the functions performed by the program in implementing the present invention and are hereinafter referred to in connection with the following description of an exemplary operation.

In operation, the first time the program is utilized at START 1, a determination is made at block 3 whether or not this is the first use of the program. If it is the first use, a series of HELP screens 5 are displayed which include instructions regarding the use and operation of the program. Thereafter, the master screen or main menu is built at block 7 and the program flow merges at point 9 to a Build or Refresh Parts List function 15. For second and subsequent uses of the system, the help screens are not displayed and the program reads the screen record from memory at block 11. Subsequent portions of the program are also merged at point 9 as indicated by the "A1" off-page connector 13. After the "PARTS LIST" is built or refreshed (updated) the screen record is saved at block 17. At that point, a determination is made as to whether or not this is the first time through the program at block 19. If it is the first time through the program, another determination is made whether or not a "Log" file exists at block 21. As will be hereinafter explained in more detail, the "Log" file contains a quick reference to previous documents which were created and printed in final form using the present invention. The "Log" file includes the "TO", "FROM", "DATE", "SUBJECT", and "REFERENCE" entries or fields as used in a prior printed memorandum or correspondence. The "Log" file also contains the identification of the unique set of short identifiers which were selected to create that memorandum. In the present example, the "Log" files are displayed in several screens with each screen containing three separate summaries of previously printed documents. The log file is automatically created whenever a document is printed in final form and may be accessed by depressing the function key PF11 "VIEW LOG". The "VIEW LOG" function is useful to the extent that the short identifiers for the many files in the program may not be remembered by a user for a particular document and before creating a new document the user may wish to review the log file in order to identify a previously written document and the precise files which were combined in that document. In many cases, however, the user will relate the short identifiers on the master menu for the files with the content of those files and be able to create new documents without referring to the "Log" file at all.

Returning to the functional flow diagram of FIG. 2, if it is determined that a Log file exists at block 21, the program reads the last log record to display those file entries in the "SELECTIONS" column C3 when the master menu is displayed. In the event this is not the first time through the program, blocks 21 and 23 are bypassed and the program restores the selections or gets the default values at block 25 to display in the "SELECTIONS" column C3 when the master menu is displayed at block 29. In subsequent portions of the program, as shown in FIG. 4, where no operator input is required, the program is returned to the "Restore Selections" block 25 as designated at the C1 off-page connector 27. Where, however, inputs are detected, the program returns to off-page connector A1 so that the display may be updated or refreshed at block 15 before the refreshed master menu is displayed at block 29. Upon the first use of the program, all of the file identifiers in columns C4 through C13 are blank except for selected ones such as row 7 which includes the various possible classifications and row 8 which displays the current date. This particular arrangement may vary depending upon the particular application.

As a user creates his first document which, in the present example, is an internal memorandum having a prearranged format, he positions the cursor on row 4, column 2, underneath the first input blank and proceeds to type in the initials, for example, of the person to whom the memorandum is to be sent. At that point, the user after insuring that the cursor is in the R4,C3 field activates the PF8 key designated in column 1 "XEDIT". At that time a file screen appears on the display as shown below, in which the user is able to insert the full name of the individual to whom the memo is being sent together with the particular mail station of that individual, the city and the state.

In the present example, the operator moves the cursor to the lines labelled ".se a=", ".se b=" and ".se c=" and inputs data as shown above within the single quote marks. The format of the file screen may also be varied depending upon the application and the particular organization in which the program is operating. After inputting the particular data, the user will push the PF12 key which activates the "FILE" command to save the input information in a file which may subsequently be accessed by cursor reference to the initials placed in column C3 when the file was created. The PF12 function also returns the user to the main menu. At that time it is noted that the initials originally typed in C3 now appear in C4 at row 5 indicating that a file has been created having those initials and may be accessed in the future for memoranda sent to the same individual.

With reference to the functional flow of FIG. 2, when the master screen is displayed at block 29, the program checks to determine whether the operator wishes to exit the program at block 31 which will occur if the operator depresses the PF1 function key "QUIT". Whenever the PF1 key is depressed, the program will terminate at 33 and return to the next level of program control (i.e. "VM"). If the PF1 key has not been depressed, the program checks to see if the cursor select function has been invoked at 35, such as would occur if an operator had positioned the cursor in one of the fields of columns C4-C13 and activated any key. If the cursor select function has been elected, the program moves the selected field to the "SELECTIONS" column, i.e. from one of the columns C4-C13 to column C3 as shown at block 37. Thereafter, the program either gets or edits the selections on the screen at block 39 depending upon whether or not the cursor select function was invoked at block 35. The program then checks for errors at block 41, and if there are no errors, the program restores the "SELECTIONS" list at block 45 and continues to scan for inputs as shown in FIG. 3 beginning with B2 off-page connector 47. In the event errors existed at block 41 error messages are moved to the screen at block 43 before the "SELECTIONS" list is restored at block 45.

After having created the first "TO" file, the user may continue to build the document parts inventory by positioning the cursor under the first character blank of C3 in R7 document being created. In the present example, the document is unclassified and accordingly the word "NONE" is inserted in that space. Assuming the user wanted the current date to appear as the date of the memorandum, the user would then proceed to the first space in C3 across from R9 which is the identifier for the "FROM" part of the memo. Here, the user would

```
M3TOTFG  SCRIPT   A1   V 132 TRUNC=132 SIZE=18 LINE=0 COL=1 ALT=4
====>
            ...+....1....+....2....+....3....+....4....+....5....+....6....
=====    * * * TOP OF FILE * * *
=====    .* Leave the single quotes, but delete any extra "<->".
=====    .* You may replace all this with ":to.tag", if desired,
=====    .* in which case "tag" must be in a "NAMES" file you have
=====    .* accessed.
=====    .* Ignore the line four lines below that begins with ":TX."
=====    .se a='T. F. Galvin'
=====    .se b='15-11-50'
=====    .se c='Irving, Tx'
=====    :tx.'&a ' '&b ' '&c '
=====    * * * END OF FILE * * *
1=NUON2=NOFF3=SPLIT4=FOR5=BACK6=JOIN7=UP108=DO109=TAB10= <-11=-> 12=FILE
``` insert his own initials, or if a secretary is typing a memo, the initials of the person requesting the memo. Again, insuring that the cursor is in one of the four spaces of the R9-C3 field, the user would again push the PF8 "XEDIT" key, and the program would display another file screen for input from the operator. The "FROM" file screen as shown below solicits the full name of the sender to be shown on the memorandum as well as the particular address of the sender and possibly his phone number and VM/ID or other relevant information.

The user will then normally create a subject file "SUBJ" by inputting a subject file identifier of up to four characters in R10 at C3. Again positioning the cursor under that field the operator would push the PF8 key and the particularly identified subject file screen would appear as shown below with all blanks to be completed as necessary by the user. The user would then key in the full subject as it would appear on the document and press PF12 to file that input and return the user to the main menu.

```
M3FRRVW  SCRIPT   A1   V 132 TRUNC=132 SIZE=14 LINE=0 COL=1 ALT=0
====>
            ...+....1....+....2....+....3....+....4....+....5....+....6....
=====       * * * TOP OF FILE * * *
=====       .* Enter your name immediately after ":name." on line 9.
=====       .* Enter your phone extension in place of "xxxx" on line 9.
=====       .* Enter your title & dept. name after ":dept." on line 10.
=====       .* Enter your location and int. zip after ":zip." (line 11.)
=====       .* Enter your electronic address after ":mail." (line 12.)
=====       .* Enter the way you sign your name after ":sig." on line 13.
=====       .* Enter your initials after ":init./" on line 14.
=====       :from.
=====          :name.Robert V. Wilder    :phone.214-556-5491, T/L 641-5491
=====          :dept.Patent Attorney/Dallas Patent Operations
=====          :zip.MS 15-11-50, PO Box 152750, Irving, Texas 75015-2750
=====          :mail.DALHQICI(WILDER)
=====       :sig.Robert V. Wilder
=====       :init./rvw
=====       * * * END OF FILE * * *
1=NUON2=NOFF3=SPLIT4=FOR5=BACK6=JOIN7=UP108=DO109=TAB10=<-11=->12=FILE
```

```
M3SBTMCL SCRIPT   A1   V 132 TRUNC=132 SIZE=4 LINE=0 COL=1 ALT=4
====>
            ...+....1....+....2....+....3....+....4....+....5....+....6....
=====       * * * TOP OF FILE * * *
=====       .* Each line of a subject block must start with ":subj.".
=====       .* Modify or delete the following lines as desired.
=====       :subj.Trademark Report.
=====       * * * END OF FILE * * *
1=NUON2=NOFF3=SPLIT4=FOR5=BACK6=JOIN7=UP108=DO109=TAB10=<-11=->12=FILE
```

After having input that information, the operator pushes the PF12 key to file away that information and return the user to the master menu screen. Thereafter, that file may be accessed by positioning the cursor under the initials which created that file and pushing the PF8 key or merely "selected" for a subsequent memo by positioning the cursor as noted and pushing the "ENTER" key.

In like manner, the user identifies and inputs to create a "REF" file and the remaining files as shown in FIG. 1. It should be noted that the editor functions include devices by which new paragraphs may be added and new lines may be added if the predetermined file space is not sufficient for the text of the memo body. An exemplary "BODY" file screen is shown below.

```
M3BORPTM SCRIPT   A1   V 132 TRUNC=132 SIZE=20 LINE=0 COL=1 ALT=20
====>
            ...+....1....+....2....+....3....+....4....+....5....+....6....
=====       * * * TOP OF FILE * * *
=====       .* If you don't need them, delete these ten comment lines.
=====       .* (A comment line is one that starts with ".*" column 1.)
=====       .* Add memo body below line 12. If you don't want ragged
=====       .* right margin, change ".ju off" to ".ju on" on line 11 below.
=====       .* Formatting tags:  :p.=paragraph, :ol.=begin ordered list,
=====       .* :eol.=end ordered list, :ul.=begin unordered list,
=====       .* :eul.=end unordered list, :sl.=begin simple list,
=====       .* :esl.=end simple list.
=====       .* Use starter set tags freely.  Save this file frequently.
=====       :body.
=====       .ju off
=====       :p.This is the first sentence in a sample paragraph.
=====       This is the second sentence in the first sample paragraph.
=====       :p.This is the second sample paragraph.
=====       :ol.
=====       :li.This is list item 1 in a sample ordered list.
=====       :li.This is list item 2 in a sample ordered list.
=====       :li.This is list item 3 in a sample ordered list.
=====       :eol.
```

```
=====  * * * END OF FILE * * *
1=NUON2=NOFF3=SPLIT4=FOR5=BACK6=JOIN7=UP108=DO109=TAB10= <-11=->12=FILE
```

The listing capability, which is part of the formating control, appears on the body file screen and allows a user to insert data items which will automatically be numbered in appropriate order.

It should be noted that certain of the document parts categories shown in the second column C2 cannot be changed by pushing the PF8 key, i.e. several of the document parts have no associated file. For example, the classification line at row 7 contains one of the three predesignated "classifications" and if a different "classification" is required that input is entered on the master menu in row 7 beginning at column C8 rather than being entered in an associated file screen.

The PF1 key when pushed returns the user to the originating program from which the document parts or memo parts program was accessed. PF2 "CHECK SPELLING", allows the user of the memo parts program to access that function in the basic VM program. The PF3 key "VIEW MEMO" allows a user to view the entire memo after it has been created before it is sent to the printer. In that connection, it should be noted that after a user creates the first memorandum using the system, the PF 3 key may then be actuated at which time a message would appear in a lower right hand corner of the master screen advising the operator that the memo is being collected together from the selected parts. After a very short delay the memo as created appears on the screen for the user to visually proofread. That process occurs each time the "VIEW MEMO" PF3 or print functions PF5 or PF6 are invoked, i.e., a new memo is collected from the parts which have been inserted in the "SELECTIONS" column C3.

The PF4 key "SCROLL LIST" is used by an operator to scroll file designations which have been created but do not appear on the screen in columns C4-C13 because of screen space limitations.

PF5 "PRINT A DRAFT COPY" assembles the document and prints it at the designated printer in draft format but does not "Log" the document into the "Log" file. PF6 "PRINT A FINAL COPY" causes the designated printer to print a copy of the created document in a final format and automatically creates a summary of the document and saves the summary in the "Log" file as hereinbefore explained. When it is desired to erase any of the files for any reason, the user will position the cursor in one of the columns C4 through C13 which is to be erased and then hit the ENTER key. That process will move the particularly identified file to the "SELECTIONS" column C3 at which time the user would press the PF7 ERASE key. As a safety measure a message then appears warning the user that another depression of the PF7 key will erase the file at which time the user can complete the deletion by pushing the PF7 key once again. As hereinbefore noted, the PF8 "XEDIT" key is used to add or delete information from the screen files and the PF9 SCROLL LOG FORWARD and PF10 SCROLL LOG BACKWARD keys are used to move from summary to summary in the "Log" file and change the list of "SELECTIONS" (C3) accordingly. PF11 VIEW LOG is used to display the 1st screen of the "Log" file from the master menu. The PF12 HELP key is used to display the instructions with regard to the use of the memo parts program.

It should be noted that as new parts are created, they are automatically added to the blank spaces in columns C4 through C13 and saved for future access. The "SELECTIONS" column C3 will always show the particular document parts selected for the most recently created document or a document from the "Log" file, and when new parts are to be designated, the user may type over the identifying characters appearing in column C3 without destroying the contents of the previous file, i.e. the file identification always appears as one of the files in columns C4 through C13 in addition to column C3 which indicates only that it has been selected for a current document.

With reference to FIGS. 3 and 4, the program functions invoked by the PF keys are illustrated in detail. As shown in those figures, the program is interrupt-oriented so that in the event none of the function keys are actuated, the program continues to cycle through the decision blocks associated with the function keys returning to the off page connector A1 and merge point 9 shown in FIG. 2.

In the event the program determines that the ERASE function has been invoked by an actuation of the PF7 key at block 49, the program next determines whether the PF7 key has been actuated for the first or second time at 57. After one actuation a flag is set at block 59 so that the second actuation of the PF7 key is effective to erase the designated file as indicated at block 61.

If the PF7 key has only been depressed once, the flag is set at block 59 and the program recycles, displays a message to the operator as hereinbefore noted, and is effective to detect a second actuation on the next scan.

If the program makes a determination that the function key PF3 "VIEW MEMO" has been actuated as shown in decision block 51, and the memo has not been built as determined at 63, the selected parts are concatenated at 65 and formatted at 67 to be displayed to the user at 71. If the memo had already been assembled as shown in the "SELECTIONS" column C3, the program insures that the memo has been formatted at 69 before displaying the memo to the user at 71. In the event the memo had not previously been formatted, it is formatted at 67 before being displayed. The program then returns to the merge point 9 shown on FIG. 2.

As shown in decision block 53, the program is effective to initiate the print routine in the event the function keys PF5 "PRINT A DRAFT COPY" or PF6 "PRINT A FINAL COPY" have been actuated. If either key has been actuated, and the memo has not been built as determined at 73, the selected parts are concatenated at 75 and formatted at 77 for printing at 81. In the event the memo had previously been built, the program goes directly from the "memo built" decision block 73 to the "memo formatted" block 79. In the event the memo had not previously been formatted, it is then formatted at 77 prior to being printed at 81.

The difference between the "PRINT A FINAL COPY" function key PF6 and the "PRINT A DRAFT COPY" function PF5 is illustrated by the subroutine including the decision block 83 and the "update log" process indicated at 85. The appearance of the memo being printed will be the same regardless of which key had been actuated. However, if the memo being printed is a final draft as determined at 83, the "Log" file is updated at 85 for future reference before the program returns to the merge point 9. If the user desires to print only a rough draft, the "Log" file is not updated and after the rough draft is printed, the program then returns to the merger point 9 and continues to cycle for the detection of actuated function keys.

If neither of the "print" function keys PF5 or PF6 have been actuated, the program continues its scanning process as shown by the off-page connector C3. In FIG. 4, the off-page connector C3 is connected to a "check spelling" decision block 87. That routine corresponds to the function key PF2 which, when actuated would effect a display of the file in connection with a "spell checker" routine. That routine is part of the underlying word processing code and similar routines are well known in the art. Accordingly, the details of the "check spelling" routine will not be elaborated upon at this point.

The next function scanned for selection is the "scroll log" function shown at decision block 89 and corresponding to the actuation of either of the function keys PF9 "SCROLL LOG FORWARD" or PF10 "SCROLL LOG BACKWARD". In the event the "scroll log" or update function keys are actuated, the program will either refresh or update the selections list with the next three summary entries of the "Log" file or the previous summary entries of the "Log" file depending upon which function key is actuated by the user. It should be noted that the "scroll log" function is available only after a user has first created multiple document summaries in the "Log" file by executing the "Print a Final Copy" function. The order of the decision blocks 49, 51, 53, and 87-97 are of no particular significance in the present example since the program continues to scan for user inputs. Rather, the functions themselves together with the routines disclosed and the interrelationships among the routines and functions should be noted.

The function key PF12 "HELP" invokes a help routine as shown in decision block 91 which is effective to display a help file at 103 containing specific instructions on the operation of the memo parts inventory or interface program.

As hereinbefore noted, the operator may actuate function key PF11 "VIEW LOG" in which case decision block 93 leads the program to display the "Log" file of part combinations for the memos previously selected and printed in final form as shown at 105.

In the present disclosure, all of the routines which lead to off-page connector "C1" are returned to FIG. 2 where the master menu is displayed and the screen has not received operator input which requires master menu updating. Those programs or routines which lead to off-page connector A1 are returned to the merge point 9 in the program shown on FIG. 2 to accomplish a refreshing or updating of the master menu to include operator inputs before displaying the master menu.

The actuation of function key PF8 "XEDIT" is detected by the decision block 95 which leads to a subsequent determination of whether or not the operator is creating a new part as shown by decision block 107. In the event the operator is creating a new part as indicated by the fact that there is no file associated with the initials or characters in the field in which the cursor is located when the function key is actuated, then a blank file is processed at 109 for display to the operator and subsequent operator input. In the event the operator is recalling a previously created file, then the program recalls the existing part file at 111 to display to the operator at 29 (FIG. 2) to receive operator input regarding the modification of the previously created file. An editing function, which processes any operator input, is also part of a pre-existing word processing program underlying the present code and is well known in the art.

The actuation of function key PF4 "SCROLL LIST" is detected at decision block 97. As hereinbefore noted, that function is effective to scroll the lists of short identifiers which are saved by the present program but may not be displayed on the master menu screen because of the size limitation of the screen. For example, the "TO" memo part in the present embodiment includes space for three rows of ten columns each, or 30 files for which short identifiers may be displayed on the screen. The program will receive additional short identifiers which may not be displayed on the screen but may be selectively displayed with the "SCROLL LIST" function. In the event that function key PF4 is actuated, the program determines whether or not the cursor is in a valid screen area at 113 in which case the next short identifier will be accessed at 115 and appear in the appropriate screen area. It should be noted that the cursor must be in a valid area on the screen for the implementation of the "SCROLL LIST" function, i.e., the cursor must be in one of the fields appearing in columns C4–C13 which can be accessed so that the program has input regarding which displayed group of short identifiers is to be scrolled. If, for example, the cursor is in the "DATE" field when the PF4 function key is actuated, an error message will be presented to the operator as shown at 117 and the program will return to the merge point 9 shown in FIG. 2.

With the present invention it can be seen that through the use of carefully designed menus and sequential decision logic functions, documents may be created very readily by mere reference to document parts previously created and stored in the system. Although the present disclosure illustrates a preferred exemplary embodiment of the document parts inventory program, it is understood that the invention may be implemented in various other forms and in different applications and will provide an improved and more efficient communication and work flow resource in many environments.

The flow charts presented herein are written in a general high-level pseudocode which can be readily translated into any high level language. The actual language and programs required to implement the functions described herein depend on the particular system in which the present invention is implemented. The specific programs for the implemented systems are considered to be within the ability of the programmer having ordinary skill in the art after having reviewed the present specification, and the present disclosure is made in order to enable implementation of the present invention in the myriad of languages and systems presently available for various applications. Although the present invention has been described in the context of a preferred embodiment, it will be readily apparent to those skilled in the programming art that modifications and variations can be made therein without departing from the scope of the present invention as defined in the following claims.

The embodiments of the present invention in which an exclusive property or privilege is claimed are defined as follows.

What is claimed is:

1. A program for use in a word processing system including an operator display and operator input means, said program being selectively operable to effect the process of:
- displaying an inventory screen which includes a plurality of generic parts indicia corresponding to predetermined standard parts of a document, each of said standard parts having associated therewith a plurality of screen areas for including short identifiers for a plurality of specific files which may be associated with said standard parts;
- receiving selectively generated operator input for assigning specified short identifiers to said plurality of screen areas;
- selectively displaying file screens for prompting operator input to define a content of said specific files;
- receiving operator input for defining the content of said specific files;
- receiving operator input for designating selected specific files to be included in a document; and
- assembling a document from said designated specific files.

2. The invention as set forth in claim 1 and further including the step of saving said specific files and displaying the corresponding short identifiers for said files in said inventory screen, whereby an operator may thereafter designate specific files to be included in a document by input reference to said short identifiers on said inventory screen without displaying said file screens.

3. The invention as set forth in claim 2 wherein said inventory screen includes visually perceptive means for identifying which of said specific files have been selected for a current document being composed.

4. The invention as set forth in claim 3 wherein said visually perceptive means comprises a selection column on said inventory screen in which appears the short identifier for the selected specific files for each of said standard parts.

5. The invention as set forth in claim 2 and further including the step of displaying the document created by the selection of said specific files.

6. The invention as set forth in claim 5 and further including the step of selectively effecting the printing of the document.

7. The invention as set forth in claim 2 and further including the step of selectively effecting the printing of the document.

8. The invention as set forth in claim 7 and further including the step of receiving operator input designating at least one particular printer at which the document is to be printed.

9. The invention as set forth in claim 7 wherein the program contains means for selectively receiving operator input identifying an electronically available file to be formatted and printed with the document.

10. The invention as set forth in claim 7 wherein the program contains means for receiving and effecting operator input designations of a selected font style in which the document is to be printed.

11. The invention as set forth in claim 7 and further including program means effective upon the actuation of the printing function to automatically create an entry in a document log file, said entry including a summary of the specified files contained in the document to be printed.

12. The invention as set forth in claim 11 and further including program means effective to display said document log file.

13. The invention as set forth in claim 2 wherein one of said standard parts is the current date.

14. The invention as set forth in claim 13 wherein the current date is automatically retrieved from a system clock and displayed in a document date field.

15. The invention as set forth in claim 14 and further including the step of receiving selectively generated operator input, effective to change the displayed date.

16. The invention as set forth in claim 2 wherein one of said standard parts is a document classification category.

17. The invention as set forth in claim 2 wherein one of said standard parts is an addressee identification.

18. The invention as set forth in claim 2 wherein one of said standard parts is an addressor identification.

19. The invention as set forth in claim 2 wherein one of said standard parts is a subject matter identification.

20. The invention as set forth in claim 2 wherein one of said standard parts is a reference identification.

21. The invention as set forth in claim 2 wherein one of said standard parts is an identification of persons receiving copies of the document.

* * * * *